United States Patent
McGuire

(10) Patent No.: US 6,539,978 B1
(45) Date of Patent: Apr. 1, 2003

(54) PIPE LINING

(75) Inventor: Brian Edward McGuire, Oldham (GB)

(73) Assignee: Lattice Intellectual Property Ltd, London (GB)

( * ) Notice: Subject to any disclaimer, the term of this patent is extended or adjusted under 35 U.S.C. 154(b) by 0 days.

(21) Appl. No.: 09/719,104

(22) PCT Filed: Jun. 10, 1998

(86) PCT No.: PCT/GB98/01552

§ 371 (c)(1),
(2), (4) Date: Mar. 22, 2001

(87) PCT Pub. No.: WO99/64222

PCT Pub. Date: Dec. 16, 1999

(51) Int. Cl.[7] ................................ F16L 55/16
(52) U.S. Cl. ........................ 138/98; 138/109
(58) Field of Search .................. 138/97, 98, 109

(56) References Cited

U.S. PATENT DOCUMENTS

| | | | | |
|---|---|---|---|---|
| 2,608,501 A | * | 8/1952 | Kimble | |
| 3,228,096 A | * | 1/1966 | Albro | 138/98 |
| 3,390,442 A | * | 7/1968 | Sosnowski, Jr. et al. | 138/98 |
| 3,462,825 A | * | 8/1969 | Pope et al. | 138/140 |
| 3,968,552 A | * | 7/1976 | Hunter | 138/98 |
| 4,207,130 A | * | 6/1980 | Barber | 138/97 |
| 4,496,499 A | * | 1/1985 | Brittain et al. | 264/36 |
| 4,985,196 A | * | 1/1991 | LeDoux et al. | 138/DIG. 5 |
| 5,048,174 A | * | 9/1991 | McGuire | 138/97 |
| 5,094,795 A | * | 3/1992 | McMillan et al. | 138/109 |
| 5,839,475 A | * | 11/1998 | Maine et al. | 138/98 |
| 5,992,467 A | * | 11/1999 | Roach | 138/98 |
| RE36,859 E | * | 9/2000 | Storah | 138/97 |

FOREIGN PATENT DOCUMENTS

| | | |
|---|---|---|
| GB | 2218485 A | 11/1989 |
| GB | 2257767 A | 1/1993 |

* cited by examiner

Primary Examiner—James Hook
(74) Attorney, Agent, or Firm—William H. Holt

(57) ABSTRACT

A lining method for a host pipe (10) including lubrication of the host pipe prior to insertion of a thermoplastic liner (11) using tight fit techniques. After allowing the inserted liner to relax, the liner is partially pulled from within the host pipe using puller (20) and clamped with an internal clamp (30) to allow fitting of a special flange (40) to the liner (11) by butt fusion, for example. Threafter the liner is allowed to revert so as to abut a flange (12) fitted to the host pipe (10). The technique is repeated at the other pipe end.

13 Claims, 1 Drawing Sheet

PIPE LINING

The invention relates to pipe lining. In pipeline systems it is known to line them with plastic pipe for refurbishment when corrosion puts the integrity of the existing pipe at risk or when a suitable barrier is required to prevent corrosion occurring. The existing host pipe may be steel, cast iron, asbestos or other rigid material. Polyethylene is typically used for the liner and provides a corrosion barrier for the oil and petrochemical industry for example.

To maximise the bore diameter it is preferred that the liner be a tight fit within the host pipe. An existing system utilises polyethylene piping which is forced through a die to compress its overall diameter as it passes in the pipe to aid insertion. Such a technique is employed in the Swagelinig (RTM) pipelining system.

There is established a number of other lining systems which when installed are not tight fit liners. This in turn means that there is an annulus between the liner pipe and the host pipe.

Where an annulus exists it is possible for substantial permeability to occur, which in turn can cause pressure balancing which could lead to implosion of the liner and consequential failure of the system.

With the Swagelining pipelining system, no annulus is present and permeability through the liner is thus greatly reduced.

The technical requirements for lined pipes may typically call for flanges every 500 meters which using non tight fit liners is achieved by drawing out the liner at each end of a lined pipe and butt fusing a polyethylene flange thereto; the line then being allowed to slip back within the host pipe. It has not been possible to deal with tight fit liners in this manner so as to allow flanges to be fitted.

The present invention is concerned with a mechanism for allowing flanges to be fitted to tight fit liners, typically polyethylene, within a host pipe.

According to the invention there is provided a method of lining a host pipe including the steps of: lubricating the host pipe along an internal face for an elongate portion at each end of the host pipe; lining the pipe with a thermoplastic liner using a tight fit technique; allowing the inserted pipe liner to relax; pulling a portion of the liner from the host pipe using limited force; affixing a thermoplastic flange thereto by a sealing technique; and allowing the liner to revert within the pipeline so as the thermoplastic flange abuts a flange on the host pipe.

Further according to the invention there is provided a puller device for pipe lining including fixing means for affixing the device to a rigid pipeline flange attached to a host pipe; gripper means for gripping a thermoplastic liner within the host pipe to allow a portion of the liner to be pulled from within the host pipe.

Separate means may be provided for holding the liner portion pulled from the pipe to allow the puller device to be removed and a thermoplastic pipe flange to be fitted prior to release of the liner.

Still further according to the invention there is provided a thermoplastic pipe flange including a first portion for butt fusion to a liner pipe and a second portion for affixing to a flanged portion of a rigid pipe.

The invention will now be described by way of example with reference to the accompanying drawings in which.

In existing tight fit arrangements such as the Swagelining (RTM) pipelining system, the polyethylene pipe is forced through a die and this allows the temporarily reduced diameter pipeliner to slide within the host pipe to the desired length. The liner then returns to its original diameter to fit hard against the internal surface of the host pipe. In the present invention, modified insertion procedures are required to handle very long pipelines which may be made up from portions of about 500 meters in length, for example.

In the modified arrangement (see FIG. 1), in order to carry out the lining procedure, a suitable pressure rated steel flange 12 is fitted to the pipeline 10 at each end which then receives the liner 11.

Figure 1:
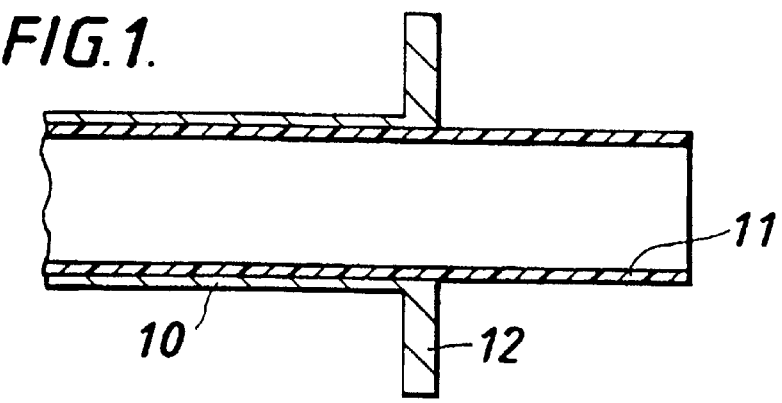
FIG. 1 shows an existing host pipe with a tight fit liner in place.

In the present method however, prior to fitting the plastic tight fit lining 11, the inside of the host pipe 10 is lubricated for a suitable length at each end, typically for 10 meters. The special lubrication is applied throughout 360° within the liner pipe wall. The length of pipe lubricated is typically dependent on the length of pipe to be lined. Thereafter the pipeline is lined with a liner 11 of polyethylene or other thermoplastic material using a tight fit technique (e.g. Swagelining (RTM) pipelining) as shown in FIG. 1.

Figure 2:
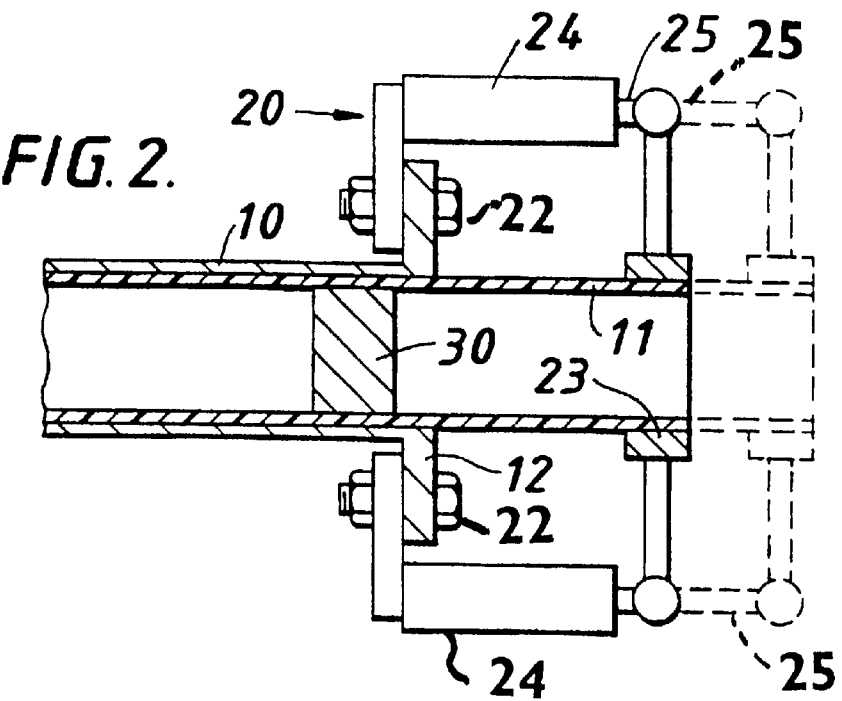
FIG. 2 shows the clamp and puller mechanisms fitted.

After insertion, the pipe is allowed to fully relax to fill the void and to ensure no longitudinal or hoop stresses are left in the liner. Once this state has been reached a second step is carried out as shown in FIG. 2.

A liner pulling device 20 is affixed to one of the host pipeline flanges 12, by means of a suitable device (e.g. bolts 22). The puller 20 also hasp a portion 23 which is configured to clamnp and grip the inner liner 11 adjacent its end. The gripper is designed to exert an effort that is not more than half the yield of the liner material. To exert the effort a pair of hydraulic cylinders 24 have an extendible rod 25 limited to the gripper 23.

The end of liner under pulling action from the puller will be stretched and due to the lubricant will emerge from the host pipe. This action will continue until a sufficient length is exposed to allow a suitable flange to be fitted. An internal clamp 30 is also provided to hold the extended liner 11 in place whilst the puller 20 is removed and further steps are carried out. This is fitted after the liner is extended.

Figure 3:
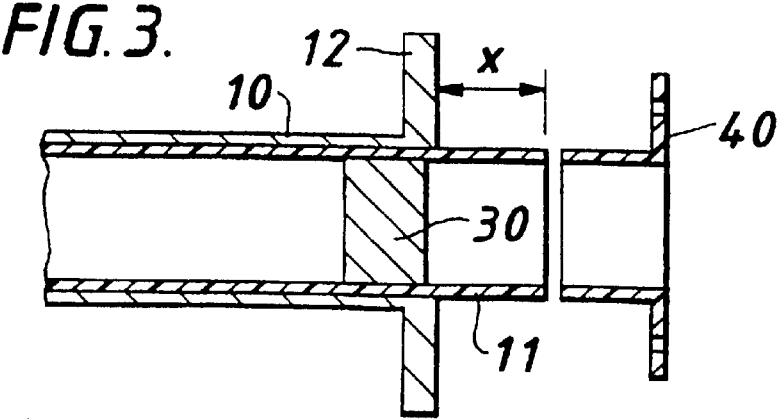
FIG. 3 shows the cutting of the extended liner to a predetermined length and the fitting of a fused end piece.

As shown in FIG. 3, after the puller 20 is removed, the clamped liner is then trimmed to the correct predetermined length (x) and a purpose designed polyethylene flange 40 is butt fused to the liner. This may take the form of a thermoplastic flanged pup piece.

After the butt fused joint has cooled, the internal and external weld beads are removed. The expander clamp 30 can then be removed and this allows the liner 11 to relax back into the host pipeline 10. Reversion may be assisted by pushing the polyethylene flange 40 towards the metal pipeline flange 12. Once the flange fitting has been completed at one end the whole process is repeated at the other end of the liner and host pipe.

Under existing circumstances, with a tight fit liner, it would not have been possible to draw the liner out without stressing the liner beyond acceptable limits. The present arrangement, however, achieves the desired technique without damage to the liner or causing undue stress.

What is claimed is:

1. A method of lining a host pipe including the steps of:
    lubricating the host pipe along an internal face for an elongate portion at each end of the host pipe;
    lining the pipe with a thermoplastic liner using a tight fit technique;

allowing the inserted pipe liner to relax;

pulling a portion of the liner from the host pipe using limited force;

affixing a thermoplastic flange thereto by a sealing technique; and, allowing the liner to revert within the pipeline so as the thermoplastic flange abuts a flange on the host pipe.

2. A method as claimed in claim 1, wherein the thermoplastic flange is attached to the liner by butt fusion.

3. A method as claimed in claim 1, wherein a thermoplastic flange is attached to each end of the liner.

4. A method as claimed in claim 1, including the step of affixing a flange to the host pipe.

5. A method as claimed in any one of claim 1, wherein the liner is pulled from the host pipe by means of a combined puller/clamp.

6. A method as claimed in claim 1 wherein the liner is passed through a die to compress the liner during insertion.

7. A method as claimed in any one of claim 1, wherein the liner and flange are of polyethylene.

8. A method as claimed in any one of claim 1, including the step of internally clamping the liner during the flange fixing step.

9. A method as claimed in any one of claim 1, including the step of trimming the liner prior to fitting the flange.

10. A puller device for pipe lining for use in a method according to claim 1, including fixing means for affixing the device to a rigid pipeline flange attached to a host pipe; gripper means for gripping a thermoplastic liner within the host pipe to allow a portion of the liner to be pulled from within the host pipe.

11. A puller device for pipe line for use in a method according to claim 1, including means for holding the liner portion pulled from the pipe to allow a thermoplastic pipe flange to be fitted prior to release of the liner.

12. A puller device for pipe line for use in a method according to claim 1, wherein fluid drive means are provided to effect the pulling of the pipe liner from the host pipe.

13. A puller device for pipe lining including fixing means for affixing the device to a rigid pipeline flange attached to a host pipe; gripper means for gripping a thermoplastic liner within the host pipe to allow a portion of the liner to be pulled from within the host pipe, means for holding the liner portion pulled from the pipe to allow a thermoplastic pipe flange to be fitted prior to release of the liner, the means for holding the liner are provided as a separate element to the puller and can be affixed internally of the liner prior to removal of the puller device to allow fitting of the liner flange.

* * * * *